United States Patent [19]

Mitsuya et al.

[11] 4,120,010
[45] Oct. 10, 1978

[54] AIR BEARING HEAD SUPPORT

[75] Inventors: Yasunaga Mitsuya, Tokyo; Shigemitsu Oguchi, Sayama; Wataru Hayakawa, Odawara; Hatsuo Takahashi, Chigasaki; Gen-ichi Ishida, Machida; Masayoshi Amasaka, Yokohama, all of Japan

[73] Assignees: Nippon Telegraph and Telephone Public Corp.; Hitachi, Ltd.; Fujitsu Limited, all of Japan

[21] Appl. No.: 800,178

[22] Filed: May 25, 1977

[30] Foreign Application Priority Data

May 27, 1976 [JP] Japan .................................. 51-61816

[51] Int. Cl.² .................. G11B 5/60; G11B 21/20; G11B 21/22; G11B 21/02
[52] U.S. Cl. ................................ 360/103; 360/75; 360/105
[58] Field of Search ................. 360/103, 75, 105

[56] References Cited

U.S. PATENT DOCUMENTS

| | | | |
|---|---|---|---|
| 3,646,536 | 2/1972 | Bleiman | 360/103 |
| 3,648,263 | 3/1972 | Kunstadt | 360/75 |
| 3,668,666 | 6/1972 | Heffernan et al. | 360/103 |
| 3,702,997 | 11/1972 | Jamieson | 360/103 |

Primary Examiner—Robert S. Tupper
Attorney, Agent, or Firm—Staas & Halsey

[57] ABSTRACT

At the start of operation, a floating magnetic head is brought into contact with the surface of a magnetic disk and the magnetic disk is then rotated to float the magnetic head off the magnetic disk surface. At the end of operation, the floating magnetic head is drawn away from the magnetic disk surface of the rotating magnetic disk and, after the lapse of a certain period of time, the magnetic disk is stopped. This prevents the floating magnetic head from sticking to the magnetic disk owing to dew condensation, permits easy miniaturization of the floating space and provides for increased recording density.

17 Claims, 9 Drawing Figures

AIR BEARING HEAD SUPPORT

BACKGROUND OF THE INVENTION

1. Field of the Invention

This invention relates to a magnetic disk unit, and more particularly to a magnetic disk unit in which a floating magnetic head is urged against the magnetic disk surface or drawn away therefrom.

2. Description of the Prior Art

Heretofore, there has been employed, as a magnetic head for a magnetic disk unit, a dynamic pressure floating type head in which a magnetic head incorporated in a slider floats off a recording medium by utilizing the dynamic effect of an air current resulting from revolution of the magnetic recording medium. To increase the recording density of the magnetic disk unit, it is necessary to minimize the floating space between the magnetic recording medium and the magnetic head. To this end, efforts are now being made to provide for miniaturized floating space. In order to maintain the floating space constant against axial run-out and vibration of the magnetic recording medium, a load force (a pressure) in equilibrium with the air pressure generated in the floating space is applied to the floating magnetic head by a load spring. Accordingly, at the start and end of the operation, no floating force is produced and the magnetic head makes contact with the magnetic disk surface.

The floating space is dependent upon the floating surface configuration of the slider and the pressure applied to the magnetic head. In the case of a conventional cylindrical surface slider whose floating surface is cylindrical, a pressure of 350 g is applied to the magnetic head for obtaining a floating space of 1.1 $\mu$m during steady-state floating (the speed of the recording medium being 40 m/sec.). Where the magnetic head and the magnetic disk surface slide on each other under the pressure of 350 g every time the operation is started and stopped, the magnetic head and the magnetic disk surface are seriously damaged, making this method entirely impracticable. The so-called loading on-off system, in which the pressure to the floating magnetic head is removed when the operation is started and stopped, has been used. With such a system, at the start of operation, after the magnetic disk reaches a predetermined rotating speed a force sufficient to float the slider against the aforesaid pressure develops, and the magnetic head is pressed against the magnetic disk surface, i.e. loaded on the magnetic disk surface. And when the operation is stopped, the magnetic head is lifted off the magnetic disk surface to remove the pressure and then the magnetic disk is stopped.

In an example of the conventional loading on-off system, the loading on-off operation is achieved by the movement of a carriage of the magnetic head. In this case, since the moving (seeking) speed of the carriage is set above a certain value so as to immediately respond to a write-read request, the floating magnetic head approaches the magnetic disk surface at an appreciably high speed when loading on the latter. Accordingly, unless the floating surface of the magnetic head and the magnetic disk are set and adjusted with extremely high accuracy, a floating force large enough to counteract the kinetic energy which is produced when the floating magnetic head approaches the magnetic disk surface is not generated, permitting the magnetic head to get into contact with the magnetic disk. When the magnetic head loads on the magnetic disk surface, the magnetic disk is rotating at a high speed, so that the loading of the magnetic head on the magnetic disk inflicts serious damage on both of them. (So-called head crush occurs.) Since the moving (seeking) speed is required to be 22 cm/sec., the range in which head crush does not occur, in the case of the cylindrical-surfaced slider, is within about $\pm 10'$ in its pitch direction and within about $\pm 15'$ in its roll direction, and extremely high accuracy is needed in the setting of the posture of the slider.

For further miniaturization of the floating space in this conventional system, it is necessary to increase the aforesaid pressure substantially in inverse proportion to the square of the floating space or reduce the floating surface of the slider. But this leads to the reduction of the range in which head cruch does not occur, and introduces difficulty in the setting and adjustment of the slider.

To avoid such a defect, there has recently been put in use the so-called contact start-stop system which does not employ the loading on-off operation. With this system, the area of the floating surface is reduced to decrease the required floating force and the force balancing with the floating force is reduced to approximately 10 g. A magnetic head slider is used which is adapted so that even when the floating surface and the magnetic disk surface are in sliding contact with each other at the start and stop of the operation, neither surface is rapidly worn, and the operation is started and stopped with these surfaces held in contact with each other.

In this known contact start-stop system, the magnetic head easily floats off the magnetic disk surface at the start of the operation and, since a flat-surfaced slider is used, the surface pressure on the magnetic disk surface is low to prevent wear of the both surfaces. Further, the slider has a large stiffness in its pitching direction and presents a stable floating characteristic. Since this system does not involve the mechanism for the loading on-off operation and does not require such high accuracy in the setting and adjustment of the floating surface, it is advantageous as compared with the landing on-off system but has the following defects.

That is, where the floating space is further reduced so as to obtain enhanced recording density, there occurs the dew condensation phenomenon in which dew drops are precipitated on the floating surface, as described in detail later on. The dew drops do not readily scatter, so that in the case of stopping the operation (the contact stop) with dew drops remaining on the floating surface, the floating magnetic head and the magnetic disk surface adhere to each other due to the surface tension of the dew drops and do not readily separate from each other. In the above example, a force larger than 100 g is needle for separating them from each other. Accordingly, if the operation is started with the floating magnetic head and the magnetic disk surface sticking to each other, an accident occurs such as breakage of the joint between the floating magnetic head and gimbal, destruction of the gimbal itself, etc.

For achieving a very small floating space, the magnetic disk surface and the floating surface of the floating magnetic head must to be finished with such high accuracy that their surface roughness is less than one fifth or sixth of the floating space. Leaving such accurately finished surfaces in close contact with each other, dew drops are also condensed between them. Accordingly, where the magnetic disk unit is not used for a long time, the same trouble as mentioned above also occurs.

SUMMARY OF THE INVENTION

An object of this invention is to provide a magnetic disk unit which is designed to prevent a floating magnetic head and a magnetic disk from sticking to each other due to the dew condensation.

Another object of this invention is to provide a magnetic disk unit which prevents a floating magnetic head and a magnetic disk from sticking to each other owing to the dew condensation, thereby enabling easy miniaturization of the floating space and providing for increased memory capacity.

Still another object of this invention is to provide a magnetic disk unit which does not require extremely high accuracy in the setting of the magnetic head floating surface even in the case of a miniaturized floating space and allows ease in the setting and adjustment of the posture of a floating magnetic head.

Other objects, features and advantages of the present invention will hereinafter become more fully apparent from the following description taken in conjunction with the accompanying drawings, which illustrate several preferred embodiments of the invention.

DESCRIPTION OF THE PREFERRED EMBODIMENTS

Figure 1:
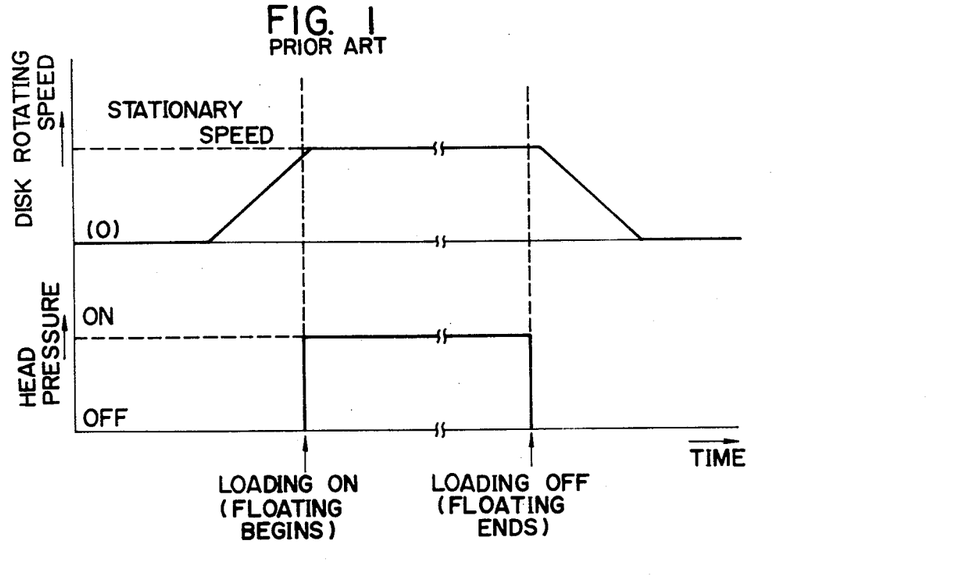
FIG. 1 is a timing chart of the operation of a conventional landing on-off system.

FIG. 1 is a timing chart of the operation of a conventional loading on-off system. At the start of operation of a magnetic disk unit, a floating magnetic head is urged against the magnetic disk surface of a magnetic disk (loading on in FIG. 1) after the disk has reached a predetermined rotating speed to produce a force large enough to float the magnetic head against the pressure applied to a slider floating surface. At the end of operation, the floating magnetic head is lifted off the magnetic disk surface (loading off in FIG. 1) on remove the pressure to the slider floating surface, and then the magnetic disk is stopped.

Figure 2A:
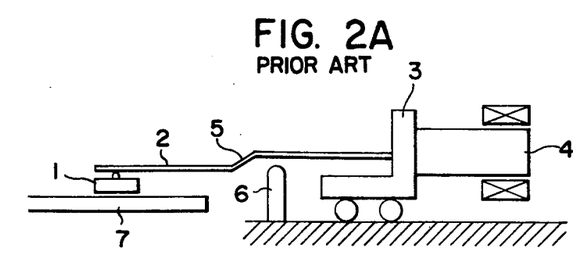
FIG. 2A is a side view showing a floating magnetic head support mechanism of the conventional loading on-off system when its magnetic head is in its steady floating state.
Figure 2B:
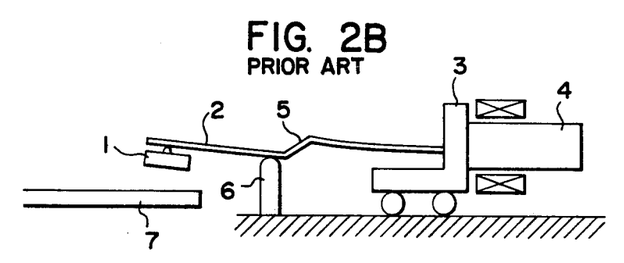
FIG. 2B is a side view showing the state in which the magnetic head of the support mechanism is lifted off from the magnetic disk surface.

A specific operative example of the above conventional system is shown in FIGS. 2A and 2B. FIGS. 2A and 2B respectively show in section the steady floating state of the magnetic head and the state in which the magnetic head is held in its lifted position above the magnetic disk surface. In FIGS. 2A and 2B, a floating magnetic head 1 is supported by a load arm 2, and is moved by a linear motor 4 in the radial direction of the magnetic disk by a carriage 3. In the steady floating state of the magnetic head, the carriage 3 assumes such a position as is shown in FIG. 2A, with ramp 5 of the load arm 2 being positioned away from cam tower 6 and the floating magnetic head 1 being urged against magnetic disk surface 7 of the magnetic disk. During the stopping the operation, the carriage 3 is moved back (to right in FIGS. 2A and 2B) by the linear motor 4. At this time, the ramp 5 moves into contact with the cam tower 6 to raise the load arm 2 in accordance with the inclination of the ramp 5, so that magnetic head 1 is lifted off the magnetic disk surface as illustrated in FIG. 2B and no pressure is applied to the magnetic head 1 (loading off).

At the start of operation in this conventional system operations take place in the reverse order (loading on). The speed of the floating magnetic head 1 during the loading on-off operation is related to the moving speed of the carriage 3 in its forward and backward directions. The moving (seeking) speed of the carriage 3 is set larger than a certain value so as to immediately respond to a write-read request. Since this speed is also used for loading the floating magnetic head 1 on the magnetic disk, the magnetic head 1 approaches to the medium surface at a relatively high speed. Accordingly, unless the floating surface of the slider of the floating magnetic head 1 and the magnetic disk surface 7 are set and adjusted with high accuracy, a force large enough to float the magnetic head 1 against the kinetic energy of the floating magnetic head 1 is not produced, permitting the floating magnetic head 1 to make contact with the magnetic disk surface 7. During the loading-on operation, the magnetic disk rotates at a high speed, so that such contact inflicts shattering damage on the magnetic floating head 1 and the magnetic disk surface 7. (In other words, so-called head crush occurs.) In this case, since a moving (seeking) speed of 22 cm/sec. is required, the range in which head crush does not occur in the case of the aforesaid cylindrical-surfaced slider is within approximately ±10′ and about ±15′ in the directions of pitch and roll of the cylindrical surface, respectively, so that extremely high accuracy is needed for positioning of the slider.

In this system, for miniaturization of the floating space, it is necessary to increase the pressure of the slider substantially in inverse proportion to the square of the floating space, or to reduce the area of the floating surface. But such miniaturization of the floating space decreases the range in which head crush does not occur, and consequently positioning the slider is difficult.

To avoid this difficulty, there has recently been employed a system which does not adopt the loading on-off operation. This is the so-called contact start-stop system in which the area of the floating surface is decreased to reduce the floating force; the pressure balancing with the floating force is reduced to about 10 g; and the floating surface and the disk surface are held in contact with each other during the starting and stopping operations. A floating magnetic head slider which is adapted to prevent rapid wear of the floating surface and the magnetic disk surface even if they are in sliding contact with each other at the start and stop of the operation is used.

Figure 3:
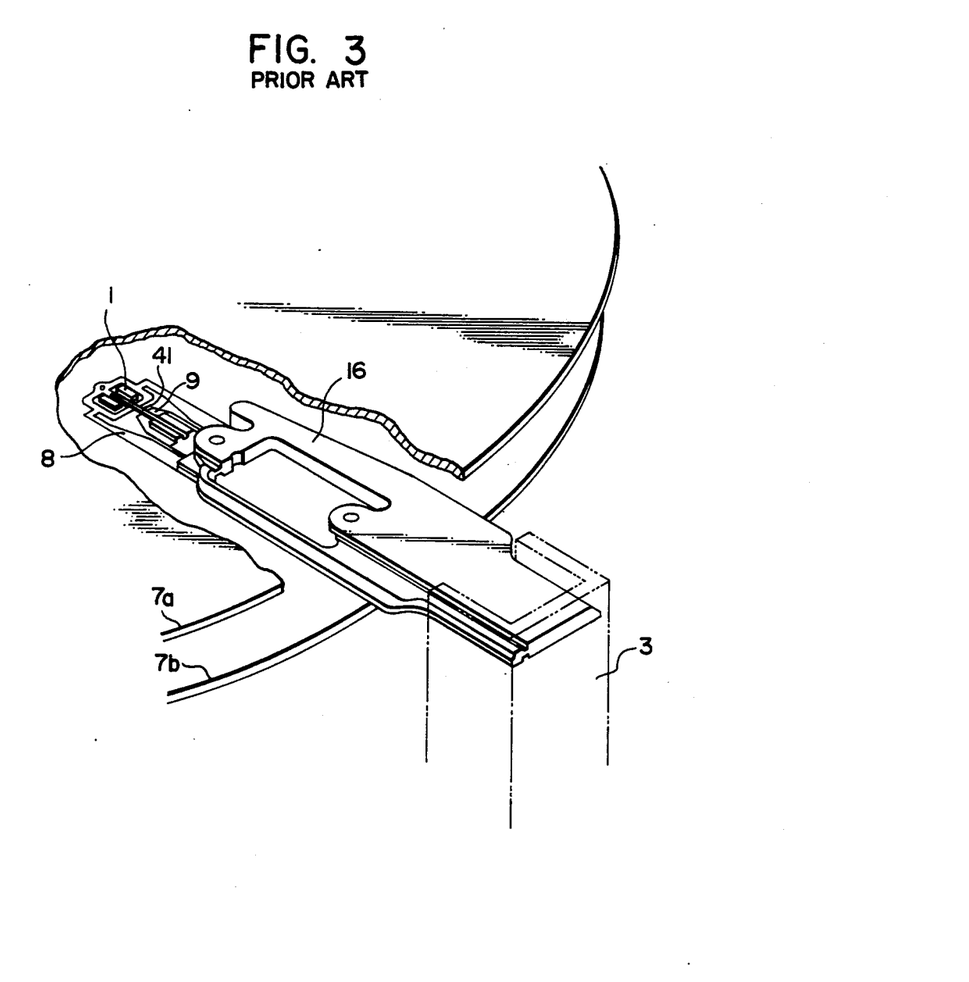
FIG. 3 is a perspective view illustrating a floating magnetic head support mechanism of a conventional contact start-stop system.

In an example of the above system, shown in FIG. 3, the floating magnetic head 1 is supported by a gimbal spring 8, and pressed is by the load spring 9 through a bar (for example, U-shaped in section). The load spring 9 is bent towards the recording medium 7 (7b in this case) with which the magnetic head 1 makes contact, applying pressure to the head 1 at all times. The gimbal spring 8 and the load spring 9 are affixed to a support arm 16. Reference numeral 3 indicates a carriage.

Figure 4:
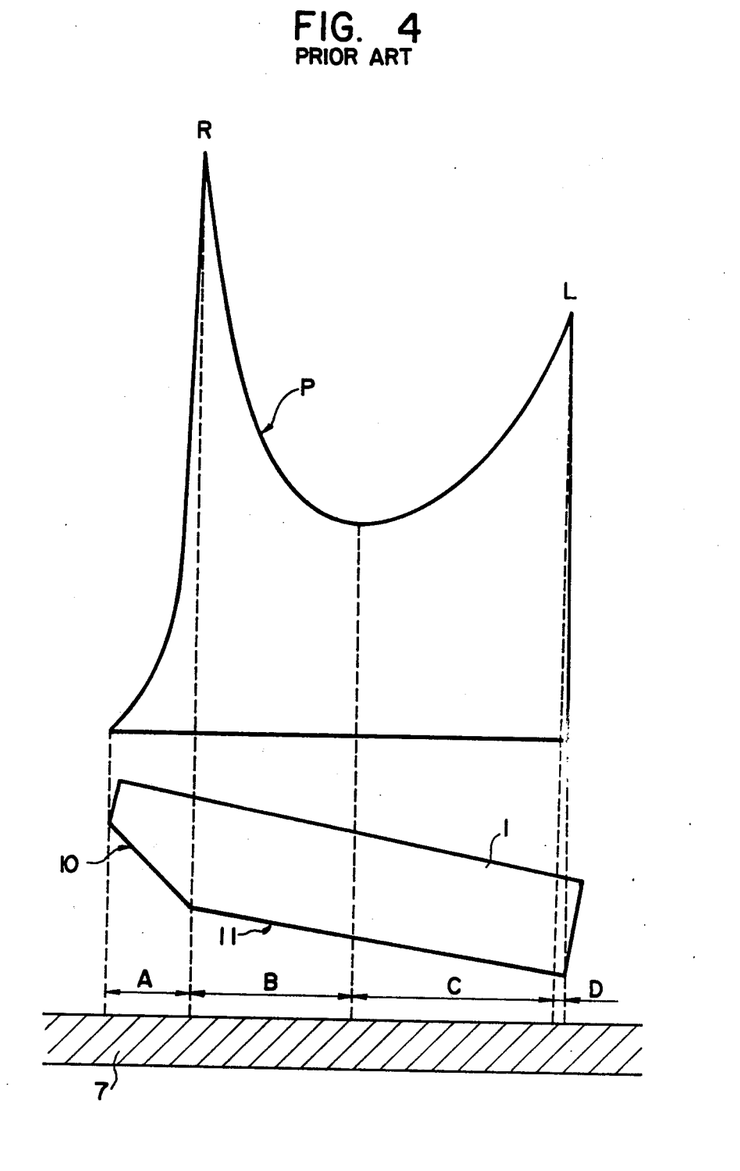
FIG. 4, consisting of A through D, is a graph showing the pressure distribution of a floating magnetic head slider.

In the illustrated example of the prior art, the floating magnetic head 1 has a flat slider such as the one depicted in FIG. 4, which has a floating surface whose side is formed by a flat surface 11 having a tapered portion 10 at the position corresponding to the end of an air inlet of the magnetic disk 7. This configuration efficiency generates high pressure at the tapered portion 10, and hence facilitates floatation of the magnetic head at the start of operation. Further, since the flat surface of the slider makes contact with the disk surface, the resulting surface pressure is small, and consequently the illustrated structure is excellent in wear resistance. Moreover, during the steady floating of the magnetic head, the pressure distribution indicated by the curve P occurs, which has maximum values in the vicinities of the air inlet end R and the air outlet end L. It is known that the above structure has a large stiffness in the direction of pitch and presents a stable floating characteristic.

Since this system does not involve the mechanism for the loading on-off operation and does not require such high accuracy in the setting and adjustment of the floating surface, the above system is advantageous as compared with the loading on-off system shown in FIGS. 2A and 2B, but has the following defects.

When the floating space is further reduced for enhancement of the recording density, the air flowing in the gap defined between the floating surface and the disk surface, which isothermally changes in the case of the floating space such as used in the prior art, undergoes an adiabatic change. That is, with the floating space employed in the prior art, the temperature of air in the floating space can be regarded as substantially constant. With a smaller floating space, however, the air temperature adiabatically varies. Letting the pressure and the absolute temperature in the floating space be represented by P and T, respectively, then the following relation holds:

$$TP^{(1-n)/n} = \text{constant} \ (1 < n < 1.4).$$

Accordingly, in those parts B and D of the pressure distribution curve P of FIG. 4 in which the pressure drops, the temperature falls in inverse proportion to $P^{(1-n)/n}$. This temperature drop causes an increase in the relative humidity, resulting in the dew condensation phenomenon wherein dew drops are precipitated on the floating surface.

The dew drops condensed on the floating surface do not readily scatter, so that in the case of the stopping operation (the contact stop), with dew drops remaining on the floating surface, the floating magnetic head and the magnetic disk surface adhere to each other due to the surface tension of the dew drops and do not readily separate from each other. In the above example, a force of larger than 100 g is needed for separating them from each other. Accordingly, if the operation is started with the floating magnetic head and the magnetic disk surface sticking to each other, there occurs an accident such as breakage of the joint between the floating magnetic head and the gimbal, destruction of the gimbal itself, etc.

For achieving a very small floating space, the magnetic disk surface and the floating surface of the floating magnetic head must be finished with such high accuracy that their surface roughness is less then one fifth or sixth of the floating space. Leaving such accurately finished surfaces in close contact with each other, dew drops are also condensed between them. Accordingly, where the magnetic disk unit is not used for a long time, the same trouble as mentioned above also occurs.

With reference to the drawings, a specific operation example of this invention will hereinbelow be described in detail.

Figure 5:
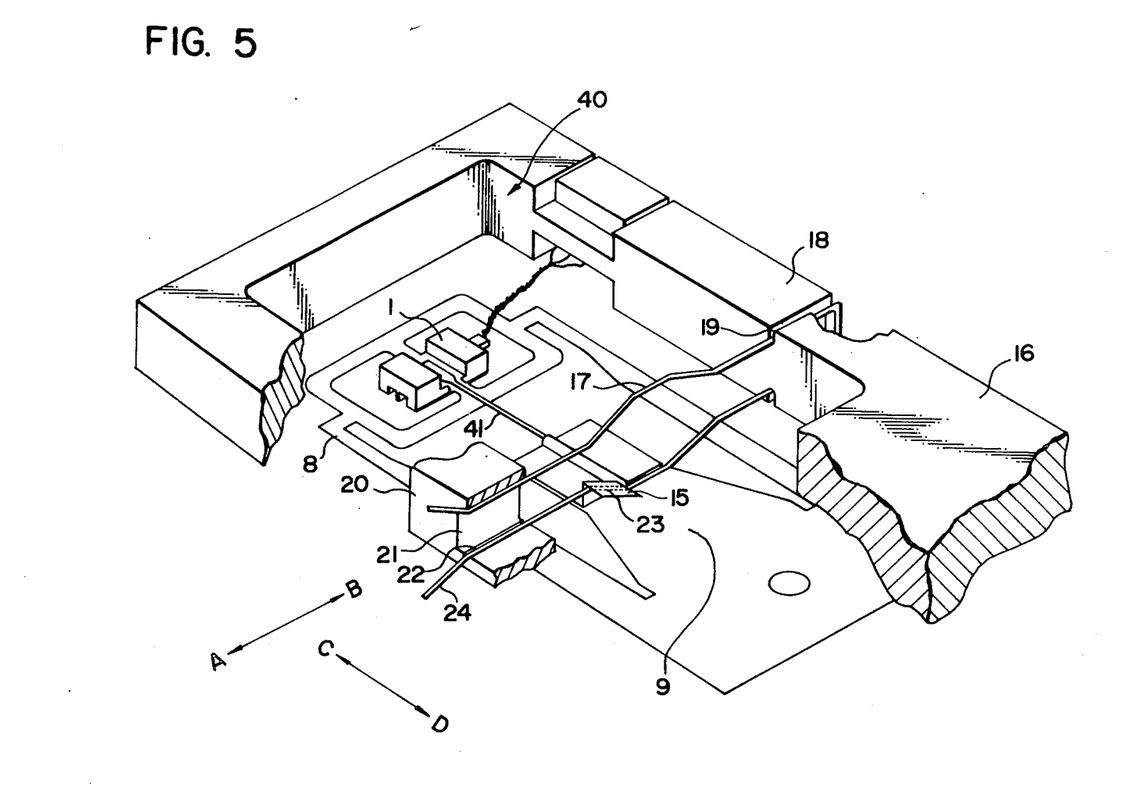
FIG. 5 is a perspective view showing a specific operative example of a loading on-off mechanism for use in the magnetic disk unit of this invention.

FIG. 5 illustrates in perspective an example of a head loading on-off mechanism for use in the magnetic disk unit of this invention.

In FIG. 5, the gimbal 8 and the load spring 9 having a pawl 15 are fixedly mounted in a head supporting opening 40 formed in the head support arm 16, and the floating magnetic head 1 is mounted on the gimbal 8. Reference numeral 17 designates a transverse pin which extends transversely of the opening 40 to contact the pawl 15. One side 20 of a frame defining the opening 40 is shown partly cut away.

The movement of the transverse pin 17 is limited in the direction C–D by a groove 19 formed in a side 18 of the frame of the support arm 16 and by a groove 22 in an aperture 21 formed in the opposite side 20 of the frame, but movement is not limited in the direction A–B. The transverse pin 17 has a ramp 23 at the portion crossing the pawl 15 and an outward ramp 24 on the outside of the aperture 21, which gives an outward spring force.

The state shown in FIG. 5 is the loading-on state, in which the ramp 23 of the transverse pin 17 is out of contact with the pawl 15 and the spring force of the load spring 9 is transmitted through the bar 41 to the floating magnetic head 1 to urge it against the magnetic disk surface. The loading-on state can be switched to the loading-off state by moving the transverse pin 17 in the direction B. At this time, the pawl 15, in contact with the ramp 23 of the transverse pin 17, is raised along the ramp. Accordingly, the bar 41 of the load spring 9, and in particular its end portion which presses the floating magnetic head 1, is lifted up so that the spring force of the load spring 9 is not transmitted to the floating magnetic head 1. The gimbal 8 is previously so shaped as to pull the floating magnetic head 1 apart from the magnetic disk surface, so that upon disconnection of the load spring 9 from the floating magnetic head 1, the head 1 is pulled away from the magnetic disk surface by the spring force of the gimbal 8, thus providing the loading-off state. At the same time, the ramp 24 of the transverse pin 17 is moved into contact with the aperture 21 to bend the transverse pin 17 inwardly, with the result that the component of force in the direction A, produced by the spring force tending to open the transverse pin 17 outwardly, acts on the transverse pin 17. Accordingly, to change to the loading-on state, the force which shifted the transverse pin 17 in the direction B is removed and the transverse pin 17 moves in the direction A due to the spring force of the pin itself. At this time, the pawl 15 falls along the inclination of the ramp 23 to transmit the spring force of the load spring 9 to the floating magnetic head 1 through the bar 41, thus providing the loading-on state.

A lug may be provided on the floating magnetic head 1 so that the tip of bar 41 can strike against it when the bar 41 moves upwards. When the bar 41 is raised with the movement of the transverse pin 17, the tip of the bar 41 collides with the aforesaid lug to lift the floating magnetic, head 1 off the magnetic disk surface 7. With such an arrangement, the gimbal 8 need not be deformed beforehand.

Figure 6:
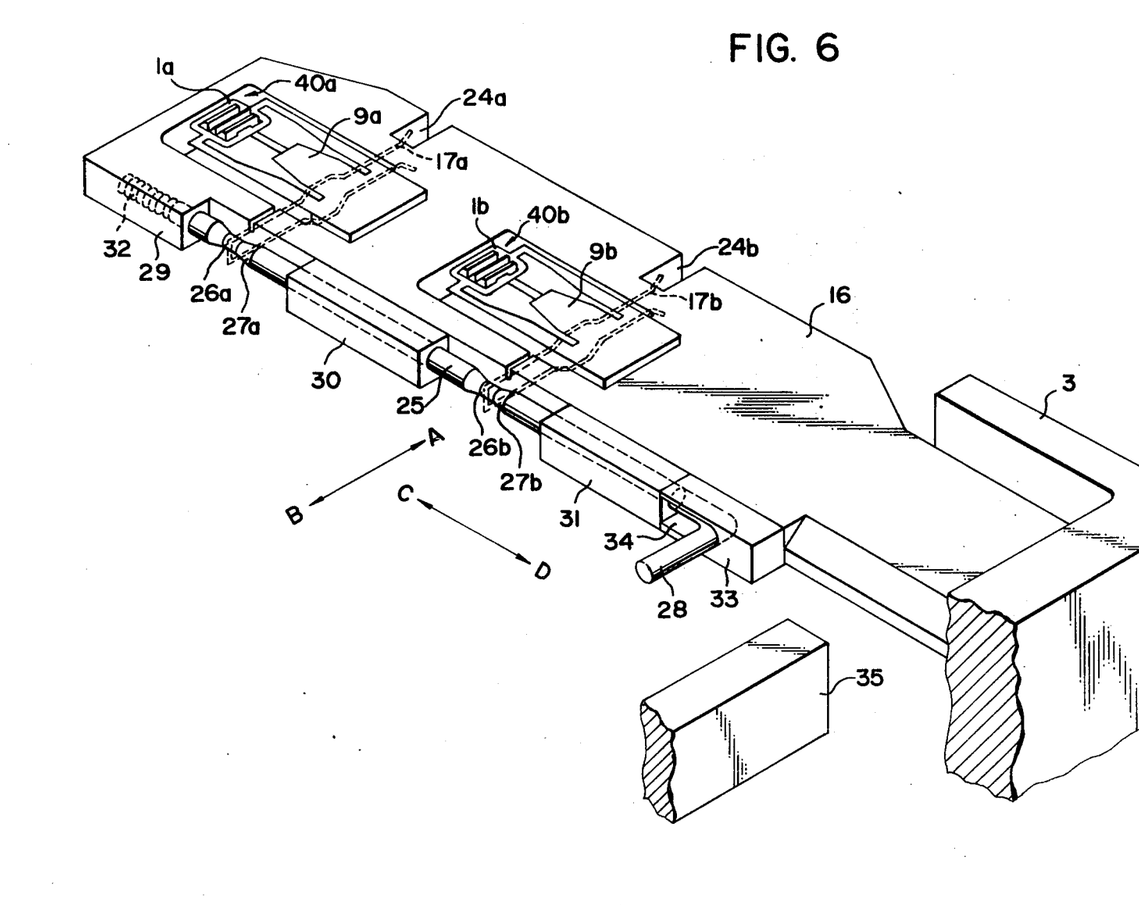
FIG. 6 is a perspective view illustrating more in detail the loading on-off mechanism depicted in FIG. 5.

FIG. 6 shows in perspective an example of the mechanism for moving the transverse pins 17 (17a and 17b) back and forth. The view shown in FIG. 6 is from the back of the mechanism depicted in FIG. 5. In FIG. 6, reference numeral 25 indicates a longitudinal pin for the forward and backward movement of the transverse pin 17. Pin 25, which is mounted on one side of the support arm 16, extends through the openings provided by transverse pins 17, as illustrated, and is movable in the directions C and D. The longitudinal pin 25 has a reduced diameter portion 26 (26a and 26b) and a tapered portion 27 (27a and 27b) contiguous thereto in the vicinity of the positions where the pin 25 crosses the transverse pins 17. Pin 25 is bent at one end, as indicated by 28. Guides 29, 30 and 31 guide the longitudinal pin 25 in its lengthwise direction (in the directions C and D). A compression spring 32 is inserted in the guide 29 to urge the longitudinal pin 25 in the direction D. Slit 34 in pin suppressor 33 guides the bent portion 28 of the longitudinal pin 25, prevents the rotation of the pin 25 and limits the movement of the pin 25 in the direction D.

In FIG. 6, the transverse pins 17 are pressed in the direction A, which corresponds to the state shown in FIG. 5, i.e. the loading-on state.

To change from loading-on state to the loading-off state, the carriage 3 is moved in the direction D by the linear motor, which is not illustrated in FIGS. 5 and 6, and bent portion 28 of the logitudinal pin 25 strikes against a stopper 35. This moves pin 25 in the direction C, which causes transverse pins 17 to slide on the tapered portion 27 (27a and 27b) of the logitudinal pin 25 and thereby causes pins 17 to move in the direction B to provide the loading-off state.

To switch from the loading-off state to the loading-on state, the carriage 3 is moved in the direction C. At this time, the longitudinal pin 25 is moved by the spring force of the compression spring 32 in the direction D.

The transverse pins 17 receive restoring forces it in the direction A due to their ramps 24 (24a and 24b) and move in the direction A sliding on the tapered portions 27 (27a and 27b) of the logitudinal 25, and thus providing the loading-on state.

The stopper 35 is fixedly mounted on the magnetic disk unit at a certain position independently of the carriage 3. Accordingly, the loading on-off operation takes place at such a position of the carriage 3 where the bent portion 28 of the longitudinal pin 25 moves into contact with the stopper 33 to shift the pin 25 in its lengthwhile direction, that is, at a constant position of the carriage 3. At the aforesaid position of the carriage 3, the floating magnetic head 1 occupies a constant position on the magnetic disk surface, so that loading on and off of the floating magnetic head 1 take place at a constant position relative to the magnetic disk surface. In the mechanism depicted in FIG. 6, outside of the loading on-off position on the magnetic disk surface, the floating magnetic head 1 is always in the off state and, inside of the aforesaid position, the head 1 is always in the on state.

Consequently, the loading on-off position is set at a place near the marginal portion of the recording medium and a storage area is set inside of the loading on-off position. In other words, the carriage 3 is moved by the linear motor to a certain position, where the magnetic head 1 is loaded on the magnetic disk surface, and then the carriage 3 is similarly shifted by the linear motor to access the head 1 to a required address in the storage area.

The loading on-off mechanism using the stopper 35 is not limited specifically to the above, but may be modified in various ways. For example the pawl 15 of FIG. 5 can be disposed so that it is inclined in a direction perpendicular to that shown in FIG. 5 and a pin interlocking with this modified pawl 15 can be provided for engagement during motion in the lengthwise direction of the carriage 3. By shifting the pin in the aforesaid lengthwise direction, the above inclined portion of the modified pawl 15 is moved up and down to raise and lower the load spring 9, by which the floating magnetic head can be brought into and out of contact with the magnetic disk surface. With such an arrangement, since the aforesaid pin can be shifted directly by the stopper (35 in FIG. 6), the transverse pin 17 (in FIGS. 5 and 6) becomes unnecessary.

Figure 7:
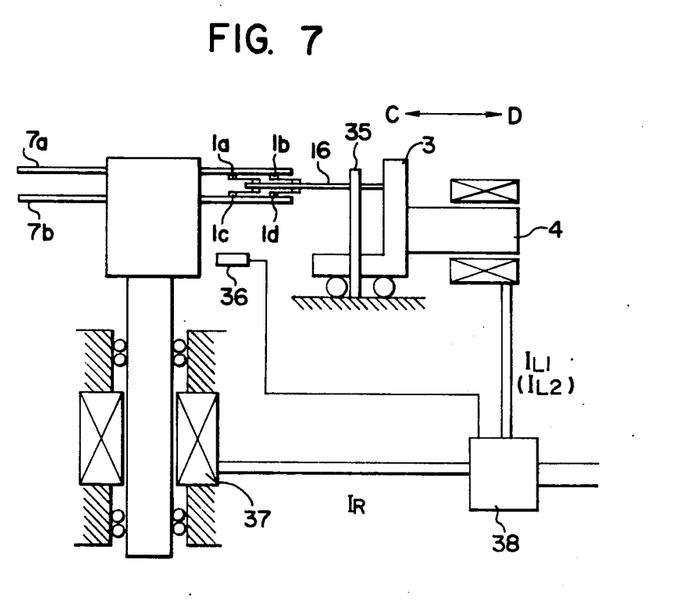
FIG. 7 is a schematic diagram explanatory of the outline of a specific embodiment of this invention.

FIG. 7 is a side view showing the outline of a specific embodiment of this invention. In FIG. 7, reference numeral 36 indicates a detector for detecting the number of revolutions of the magnetic disk (recording media 7a and 7b); 37 designates a motor for driving the magnetic disk; and 38 identifies a current controller for controlling driving currents of the linear motor 4 and the drive motor 37. The other reference numerals represent the parts corresponding to those in FIGS. 3 and 6.

When the rotation of the magnetic disk is stopped, the carriage 3 is retracted in the direction D to a predetermined position and retained there to maintain the loading-off state. To start the operation, after making sure by the detector 36 that the magnetic disk (the recording media 7a and 7b) is standing still, a current $I_{L1}$ is applied to the linear motor 4 to move the carriage 3 forwards in the direction C to provide the loading-on state. Then, a current $I_R$ is applied to the drive motor 37 to rotate the magnetic disk, thereby floating the magnetic heads (1a, ... 1d). To stop the operation, a current $I_{L2}$ is applied to the linear motor 4 to move back the carriage 3 in the direction D and hold it at the retracted position. Following this, the current $I_R$ to the drive motor 37 is cut off to stop the rotation of the magnetic disk. That is, the loading on-off operation of the present unit can be achieved by controlling the currents $I_L$ and $I_R$ with the current controller 38.

Figure 8:
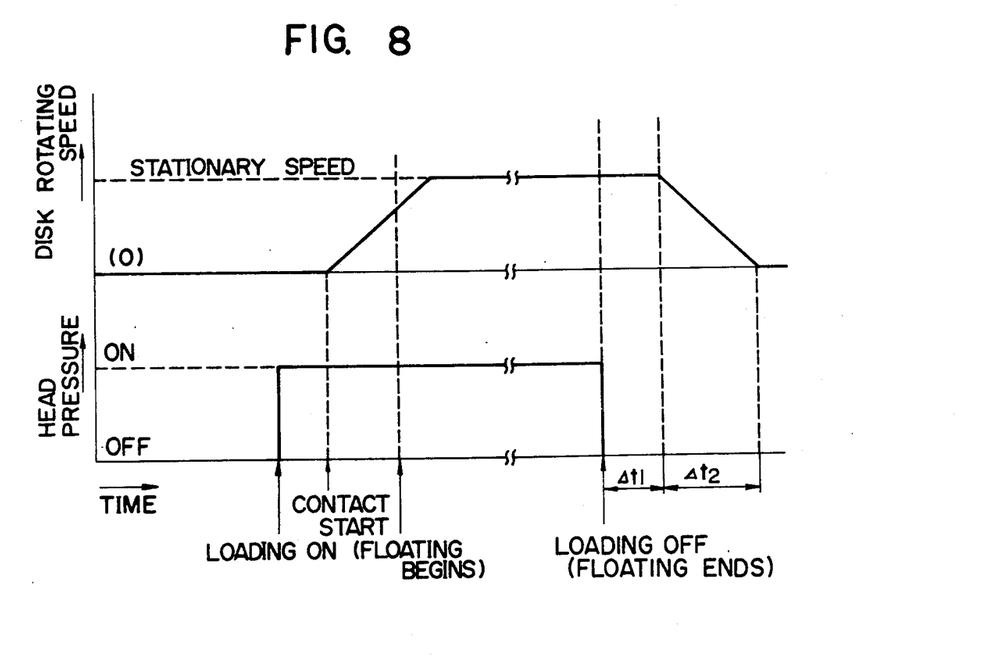
FIG. 8 is a timing chart of the operation of the respective parts of the embodiment of this invention shown in FIG. 7.

FIG. 8 is a timing chart explanatory of the operations of respective parts of the magnetic disk unit embodying this invention. At the start of operation, the floating magnetic head is urged against the surface of the magnetic disk standing still (LOADING ON) and then the rotation of the magnetic disk is started (CONTACT START). Then, when the revolving speed of the magnetic disk exceeds a certain value, the floating magnetic head begins to float (FLOATING BEGINS).

To stop the operation, the magnetic head floating in the steady state is drawn apart from the magnetic disk surface to a position where the floating surface of the magnetic head does not contribute to the generation of the floating power (LOADING OFF). Then, after a time $\Delta t1$, the disk drive motor 37 is turned off to stop the rotation of the magnetic disk after a time $\Delta t2$. When the magnetic disk unit is not in use, the floating magnetic head is retained at a distance from the magnetic disk surface.

In the present invention, since the rotation of the magnetic disk is contact-started after the magnetic head is loaded thereon, there is no possibility of the so-called head crush which is experienced in the prior art system in which the magnetic head is loaded on the rotating magnetic disk. Accordingly, accuracy of setting of the head floating surface need not be so high and its setting and adjustment are easy.

Further, the magnetic disk goes on rotating for the time $\Delta t1$ after the magnetic head is loaded off from its floating state and, even after the drive motor is disconnected from its power source, the magnetic disk rotates due to inertia for the time $\Delta t2$. Since the floating power is substantially in proportion to the square of the floating space, little floating power is generated when the distance between the disk and the floating surface is more than ten times the steady-state floating space. But, to ensure proper operation when the magnetic head is separated from the magnetic disk surface, and to facilitate the adjustment of the mechanism therefor, in practice the distance of the magnetic head from the magnetic disk surface is properly about 0.5 mm. At such a distance, the speed of the air current swirling along with the magnetic disk surface is substantially equal to the revolving speed of the magnetic disk surface, so that the air flows on the floating surface of the magnetic head at a speed substantially equal to the peripheral speed of the magnetic disk. That is, in the aforesaid time $\Delta t1$, a high-speed air current is blown against the floating surface and, also in the subsequent time $\Delta t2$, the floating surface is still exposed to an air stream.

Since evaporation of water drops condensed on the floating surface during the steady-state floating of the magnetic head is facilitated by the exposure of the floating surface to the high-speed air stream, the water drops can be completely evaporated by a suitable selection of the time $\Delta t1 + \Delta t2$.

Even if the magnetic disk unit is left as it is for a long period of time after completion of floating, since the floating magnetic head is spaced apart from the magnetic disk surface, there is no likelihood of the magnetic head and the magnetic disk sticking to each other due to the water drops condensed therebetween as experienced when they are left in close contact with each other in the conventional contact-start-stop system. Moreover, after completion of the operation, the magnetic head is retained at its raised position and even if the magnetic head is brought down from the raised position to be pressed against the magnetic disk surface at the start of the operation, the magnetic head and the magnetic disk do not stick to each other if the time $\Delta t1 + \Delta t2$ is set so that water drops are completely evaporated within this time.

As has been described in the foregoing, the use of this invention avoids the situation in which the magnetic head and the magnetic disk stick to each other owing to water drops condensed therebetween. This permits easy miniaturization of the floating space, and enables a remarkable increase in the capacity of the magnetic disk unit.

Numerous changes may be made in the above described devices and different embodiments of the invention may be made without departing from the spirit thereof; therefore it is intended that all matter contained in the foregoing description and in the accompanying drawings shall be interpreted as illustrative and not in a limiting sense.

What is claimed is:

1. A magnetic disk unit comprising:
    (a) floating magnetic head support means for supporting a floating magnetic head by a gimbal fixedly provided in an opening and urging the floating magnetic head against the surface of a magnetic disk at a predetermined pressure by a load spring provided in the opening;
    (b) carriage means for moving the floating magnetic head support means radially of the magnetic disc;
    (c) control means for actuating the load spring to apply the urging force to the floating magnetic head in response to movement of the floating magnetic head by the carriage means in a first direction radial of the magnetic disk and for putting the load spring out of its actuated state to move the urging force from the floating magnetic head in response to the movement of the floating magnetic head in a second direction;
    (d) means for moving the floating magnetic head by the carriage means in the first direction, applying the urging force to the floating magnetic head by the control means to bring the floating magnetic head into contact with the magnetic disc surface, starting the magnetic disc to revolve and raising its revolving speed up to a steady-state value to lift the magnetic head at the start of operation of the magnetic disc unit; and
    (e) means for moving the floating magnetic head by the carriage means in the second direction, removing the urging force from the floating magnetic head by the control means to raise the floating magnetic head from the rotating magnetic disc surface and stopping the magnetic disc at the time of stopping the operation of the magnetic disc unit.

2. A magnetic disk unit according to claim 1, which further includes means for pressing the floating magnetic head against the magnetic disk surface and means for drawing apart the former from the latter when a carriage of the floating magnetic head passes a certain position.

3. A method for using a magnetic recording disc, comprising the steps of:
    bringing a flying magnetic head assembly into contact with the magnetic recording disc while the disc is not rotating;
    rotating the disc to float the head assembly to a working distance between the disc and the head assembly;
    removing the head assembly from the vicinity of the disc while the disc is rotating; and
    stopping the rotation of the disc.

4. The method of claim 3, wherein the step of bringing the magnetic head assembly into contact with the magnetic recording disc comprises exerting a spring force on the head assembly, and the step of removing said head assembly comprises relieving said spring force.

5. The method of claim 4, wherein the steps of exerting said spring force and relieving said spring force are performed by engaging and disengaging a pawl provided by a load spring.

6. The method of claim 3, further comprising the step of advancing the magnetic head assembly toward the center of the magnetic disc past a predetermined point before bringing the magnetic head assembly into contact with the magnetic recording disc, and the step of withdrawing the magnetic head assembly away from the center of the magnetic disc past the predetermined point before removing the head assembly from the vicinity of the disc.

7. The method of claim 6, wherein the step of bringing the magnetic head assembly into contact with the magnetic recording disc comprises exerting a spring force on the head assembly, and the step of removing the head assembly comprises relieving the spring force.

8. The method of claim 7, wherein the step of exerting the spring force on the magnetic head assembly is performed by disengaging a pawl provided by a load spring after the head assembly has advanced to the predetermined point, and the step of relieving the spring force is performed by disengaging the pawl provided by the load spring after the head assembly has withdrawn to the predetermined point.

9. The method of claim 8, further comprises the step of ensuring that the magnetic disc is not rotating before advancing the magnetic head assembly past the predetermined point.

10. A magnetic disc unit for using magnetic discs, comprising:
   a magnetic disc support means for supporting at least one magnetic disc;
   rotating means for rotating said magnetic disc support means, said rotating means being energizable and de-energizable;
   at least one gimbal;
   at least one flying magnetic head assembly, each of said at least one head assemblies being mounted on a corresponding one of said at least one gimbals;
   at least one load spring, each of said at least one load springs corresponding to one of said at least one head assemblies;
   at least one first means cooperating with each of said at least one load springs for forcing each of said corresponding at least one head assemblies against one of said at least one magnetic discs before said rotating means is energized; and
   at least one second means for relieving the forces exerted by said first means before said rotating means is de-energized.

11. The magnetic disc unit of claim 10, further comprising at least one magnetic head support arm, each of said at least one magnetic head support arms having at least one opening therein each of said at least one gimbals and each of said at least one load springs being mounted in one of said at least one openings.

12. The magnetic disc unit of claim 11, further comprising means for radially moving each of said at least one magnetic head support arms past a predetermined point toward the center of said at least one magnetic discs and past said predetermined point away from the center of said at least one magnetic discs.

13. The magnetic disc unit of claim 12, further comprising at least one longitudinal pin, each of said at least one longitudinal pins corresponding to one of said at least one magnetic head support arms and being movably mounted thereon, and wherein said at least one first and second means include means, operationally connecting each of said at least one longitudinal pins with each of said at least one load springs which are mounted on said corresponding at least one magnetic head support arms, for applying pressure to each of said at least one head assemblies which are mounted on said at least one magnetic head support arms when said at least one magnetic head support arms move toward the center of said at least one magnetic discs past said predetermined point, and for removing said pressure when said at least one magnet head support arms move away from the center of said at least one magnetic discs past said predetermined point.

14. The magnetic disc unit of claim 13 wherein each of said at least one longitudinal pins has a bent portion, and further comprising means mounted on said magnetic disc unit for engaging said at least one bent portions when said at least one magnetic head support arms move away from the center of said at least one magnetic discs past said predetermined point.

15. The magnetic disc unit of claim 14, wherein said rotating means comprises a motor and said means for radially moving each of said magnetic head support arms comprise at least one linear motor.

16. A magnetic disc unit comprising:
   a magnetic head support arm having an opening therein;
   a gimbal fixedly provided in the opeining of said magnetic head support arm;
   a floating magnetic head mounted on said gimbal;
   a load spring mounted in the opening of said magnetic head support arm;
   a magnetic disc corresponding to said magnetic head support arm;
   urging means cooperating with said load spring for urging said floating magnetic head against the surface of said magnetic disc at a predetermined pressure, said urging means being activatable and deactivatable;
   carriage means for moving said magnetic head support arm along the radium of said disc, said carriage means being movable in a first direction toward the center of said disc and in a second direction away from the center of said disc;
   control means for activating said urging means in response to the movement of said floating magnetic head by said carriage means in said first direction, and for deactivating said urging means in response to movement of said floating magnetic head by said carriage means in said second direction
   rotating means for rotating said magnetic disc, said rotating means being activatable and deactivatable;
   means for moving said floating magnetic head by said carriage means in the first direction, activating said urging means by said control means to bring said floating magnetic head into contact with the surface of said magnetic disc, and activating said rotating means and raising the rotating speed of said magnetic disc up to a steady-state value to lift said floating magnetic head at the start of operation of the magnetic disc unit; and
   means for moving said floating magnetic head by said carriage means in the second direction, deactivating said urging means by said control means to raise said floating magnetic head from the rotating surface of said magnetic disc, and deactivating said rotating means at the time of stopping the operation of the magnetic disc unit.

17. A magnetic disc unit according to claim 16 which further includes means for pressing said floating magnetic head against said magnetic disc and means for drawing apart the former from the latter whan said carriage means passes a certain position.

* * * * *

UNITED STATES PATENT OFFICE
CERTIFICATE OF CORRECTION

Patent No. 4120010                  Dated October 10, 1978

Inventor(s) Yasunaga Mitsuya et al.

It is certified that error appears in the above-identified patent and that said Letters Patent are hereby corrected as shown below:

* Col. 1, line 61, change "Accordinly" to --Accordingly--

Col. 2, line 54, change "needle" to --needed--

Col. 3, line 63, change "on" to --to--

Col. 4, line 12, delete "the" (1st occasion)

* Col. 7, line 41, change "logitudinal" to --longitudinal--

* Col. 7, line 51, change "logitudinal" to --longitudinal--

Signed and Sealed this

Sixth Day of March 1979

[SEAL]

Attest:

RUTH C. MASON
*Attesting Officer*

DONALD W. BANNER
*Commissioner of Patents and Trademarks*